United States Patent
Christensen et al.

(10) Patent No.: US 12,044,211 B2
(45) Date of Patent: Jul. 23, 2024

(54) YAW SYSTEM WITH YAW CONTROL BASED ON CONTROL SIGNAL

(71) Applicant: VESTAS WIND SYSTEMS A/S, Aarhus N. (DK)

(72) Inventors: Flemming Christensen, Hinnerup (DK); Pharthipan Balasubramaniam, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/925,240

(22) PCT Filed: May 6, 2021

(86) PCT No.: PCT/DK2021/050145
§ 371 (c)(1),
(2) Date: Nov. 14, 2022

(87) PCT Pub. No.: WO2021/228337
PCT Pub. Date: Nov. 18, 2021

(65) Prior Publication Data
US 2023/0228244 A1    Jul. 20, 2023

(30) Foreign Application Priority Data
May 12, 2020  (DK) ............................ PA 2020 70305

(51) Int. Cl.
*F03D 7/02*       (2006.01)
(52) U.S. Cl.
CPC ......... *F03D 7/0204* (2013.01); *F03D 7/0244* (2013.01); *F03D 7/0284* (2013.01); *F05B 2270/337* (2013.01)

(58) Field of Classification Search
CPC ...... F03D 1/181; F03D 7/0204; F03D 7/0208; F03D 7/0244; F03D 7/0284; F05B 2270/337
See application file for complete search history.

(56) References Cited

U.S. PATENT DOCUMENTS 8,022,566 B2 * 9/2011 Loh .................. F03D 7/0272
                                         416/85
9,631,608 B2 * 4/2017 Garcia .................. H02P 9/102
(Continued)

FOREIGN PATENT DOCUMENTS

EP   3260698 A1   12/2017
WO   2021228337 A1   11/2021

OTHER PUBLICATIONS

Danish Patent and Trademark Office, 1st Technical Examination including the Search Report and Search Opinion for Application PA 2020 70305 dated Oct. 15, 2020.
(Continued)

*Primary Examiner* — Topaz L. Elliott
*Assistant Examiner* — Jason G Davis
(74) *Attorney, Agent, or Firm* — Patterson + Sheridan, LLP

(57) ABSTRACT

A controller for the yaw function is coupled with a yaw system for controlling the operation of yaw motors in the yaw function of a wind turbine. A control signal is provided to the controller that is reflective of a grid condition of an electric grid. The control signal is evaluated, and the controller selectively delays the yaw function based upon the control signal. In another embodiment, the yaw system includes brakes for the yaw motors that are coupled with an independent power supply. The controller selectively delays the yaw function if the brake power supply is not operational.

17 Claims, 6 Drawing Sheets

(56) References Cited

U.S. PATENT DOCUMENTS

| | | |
|---|---|---|
| 2013/0270823 A1 | 10/2013 | Hannon |
| 2017/0145989 A1 | 5/2017 | Ritter et al. |
| 2018/0306169 A1 | 10/2018 | Dharmadhikari et al. |
| 2019/0072069 A1 | 3/2019 | Rask |
| 2019/0101101 A1 | 4/2019 | Dharmadhikari et al. |

OTHER PUBLICATIONS

PCT, International Search Report for Application PCT/DK2021/050145 dated Feb. 8, 2021.
PCT, Written Opinion of The International Searching Authority for Application PCT/DK221/050145 dated Feb. 8, 2021.

* cited by examiner

YAW SYSTEM WITH YAW CONTROL BASED ON CONTROL SIGNAL

TECHNICAL FIELD

This invention relates generally to wind turbines and the yaw control of such wind turbines.

BACKGROUND OF THE INVENTION

Modern utility scale wind turbines typically are equipped with an active yaw control system. Yaw control systems are used to move the nacelle of the wind turbine and to ensure that the nacelle and the rotor face into the wind during power generation. This ensures efficient use of the wind turbine based upon wind conditions.

Common types of active yaw control systems involve the use of electric or hydraulic drive systems that have a plurality of active drives coupled with the nacelle of the wind turbine to move the nacelle angularly in azimuth with respect to the tower. Typically, the nacelle is mounted on the tower by a roller yaw bearing or gliding yaw bearing to allow the nacelle to yaw smoothly. A yaw braking system may also be provided to keep the nacelle at a particular azimuth position. The yaw drives may each include a yaw motor and the motors collectively drive a gear element for movement of the nacelle. A plurality of yaw drives with respective motors and output gear elements, generally mounted to the nacelle, are positioned in engagement with a large gear or toothed wheel, generally mounted to the tower. The drives may be arranged around the base of the nacelle to operate together under the direction of a yaw controller to provide the desired yaw control. Oftentimes the motors of the yaw drives may be equipped with an electromechanical brake.

Active yaw control systems are controlled by a suitable controller which, for example, may be part of the larger wind turbine control system. The controller has the task of operating the various yaw drives and moving the nacelle to a commanded yaw position, or moving the nacelle to maintain a zero heading with respect to the relative wind direction. The yaw control implemented by the controller is usually operated, based on the variable nature of the wind; to address changing wind conditions; but also to keep the activation of the yaw drives at an acceptable level that minimizes wear. Also, external conditions apart from the wind variations, are taken into account for control of a wind turbine.

For example, in order to secure a stable electrical grid, wind turbines are subjected to national grid compliance requirements. One of those requirements states that the wind turbine must stop power production under certain voltage and frequency variations on the grid. The voltage variations can be as large as −20% to +36% of nominal voltage. Generally, the more extreme variations are of a shorter duration, such as a few seconds or sometimes a few minutes.

For continuous operation in response to grid variations, the actual voltage variation can be up to +/−13%, For example, Table I is an exemplary table of grid variation compliance parameters for controlling the generation of power from a wind turbine experiencing varying grid conditions.

TABLE 1

Above +36% for maximum 0.15 s
+25% to +36% for maximum 2 s
+16% to +25% for maximum 60 s
+13% to +16% for maximum 1800 s
+13% to −13% continuously
−13% to −15% for maximum 180 s
−15% to −20% for maximum 12 s In addition to operational compliance of the wind turbine, variations in the electrical grid voltage and frequency can also detrimentally affect the operation of the yaw control system and particularly the operation of the yaw drives. In wind turbines having yaw drives or drive systems using electrical yaw motors, such as asynchronous induction motors, the motors are often directly fed with power that is subjected to the above-noted grid voltage and frequency variations. The yaw motors are also often equipped with an electromechanical brake. Such yaw brakes need power to disengage from their braking function. Such power for the brake is often fed directly from the motor terminal box, either as AC or DC power that is fed via a rectifier. As such, the motor brake is also subject to the issues of grid variations.

Normally electric motors and their brakes are designed to function within a voltage variation of +/−10%. Outside of that range, they may not operate properly. For example, the electric motor may be able to endure shorter burst of excessive voltage, but for an over voltage condition there is a risk of overloading the yaw system during gusts, due to higher torque from the yaw motors. In the opposite situations involving under voltage powering of the yaw system, there is a risk of having too little yaw capacity, due to the resulting lower torque delivered from the yaw motors.

Still further, an additional issue presented in the power variation scenarios is that many yaw motor brakes will not disengage properly below −10% voltage variations. As a result, in worst case scenario, most of the generated yaw motor torque will be used to overcome the brake torque from a brake that is not properly disengaged. This leads to a significantly lower yaw capacity for the system. A brake that does not disengage will suffer early wear out, when it is dragged by the yaw motor. Still further, the yaw motors and the rest of yaw system could be overloaded in such a scenario.

Thus, there is a need for improved systems and methods which enable the detection of variations in the grid associated with wind turbines and operation and control of the yaw systems based on the detected variations.

SUMMARY OF THE INVENTION

In one embodiment of the invention a wind turbine includes a nacelle mounted to move on a tower for providing electrical power to an electric grid. The wind turbine has a yaw system with one or more yaw motors that are operable to provide a yaw function for the wind turbine and move the nacelle with respect to the tower. A controller is coupled with the yaw system for controlling the operation of the yaw motors in the yaw function. A control signal is provided to the controller that is reflective of a grid condition of an electric grid and the controller is configured for evaluating the control signal and selectively delaying with a delay the yaw function based upon the control signal, and proceed with the yaw function after expiry of the delay. For example, a suitable grid variation range, such as for voltage or frequency, for performing the yaw function might be used by the controller. The controller compares the control signal to the grid variation range and selectively delays the yaw function based upon the comparison. If the control signal is outside of the grid variation range, the yaw function may be delayed. The delay may be a time delay.

In one embodiment, the controller, upon a determination that the control signal is outside of the grid variation range, is further configured to periodically compare the control signal to the grid variation range over time. This allows the yaw function to proceed if the control signal indicates that the grid conditions are within an acceptable range.

In another embodiment, a time limit for the delay might be used so as to perform the yaw function if sufficient time has elapsed even if the control signal indicates that the grid condition is not within an acceptable range. To that end, the controller may use a time limit and the controller is configured to determine if the delay of the yaw function exceeds the time limit, and will proceed with the yaw function if the delay exceeds the time limit.

In another embodiment, the yaw system includes one or more brakes for interacting with the yaw motors and a separate power supply for the brakes. A brake control signal that is reflective of the power supply for the brakes is used by the controller. The controller is configured for evaluating the brake control signal and selectively delaying the yaw function based upon the brake control signal. For example, the brake control signal may be reflective of whether the brake power supply is operational. If the brake power supply is not operational, the yaw function is selectively delayed.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DESCRIPTION OF EMBODIMENTS OF THE INVENTION

Figure 1:
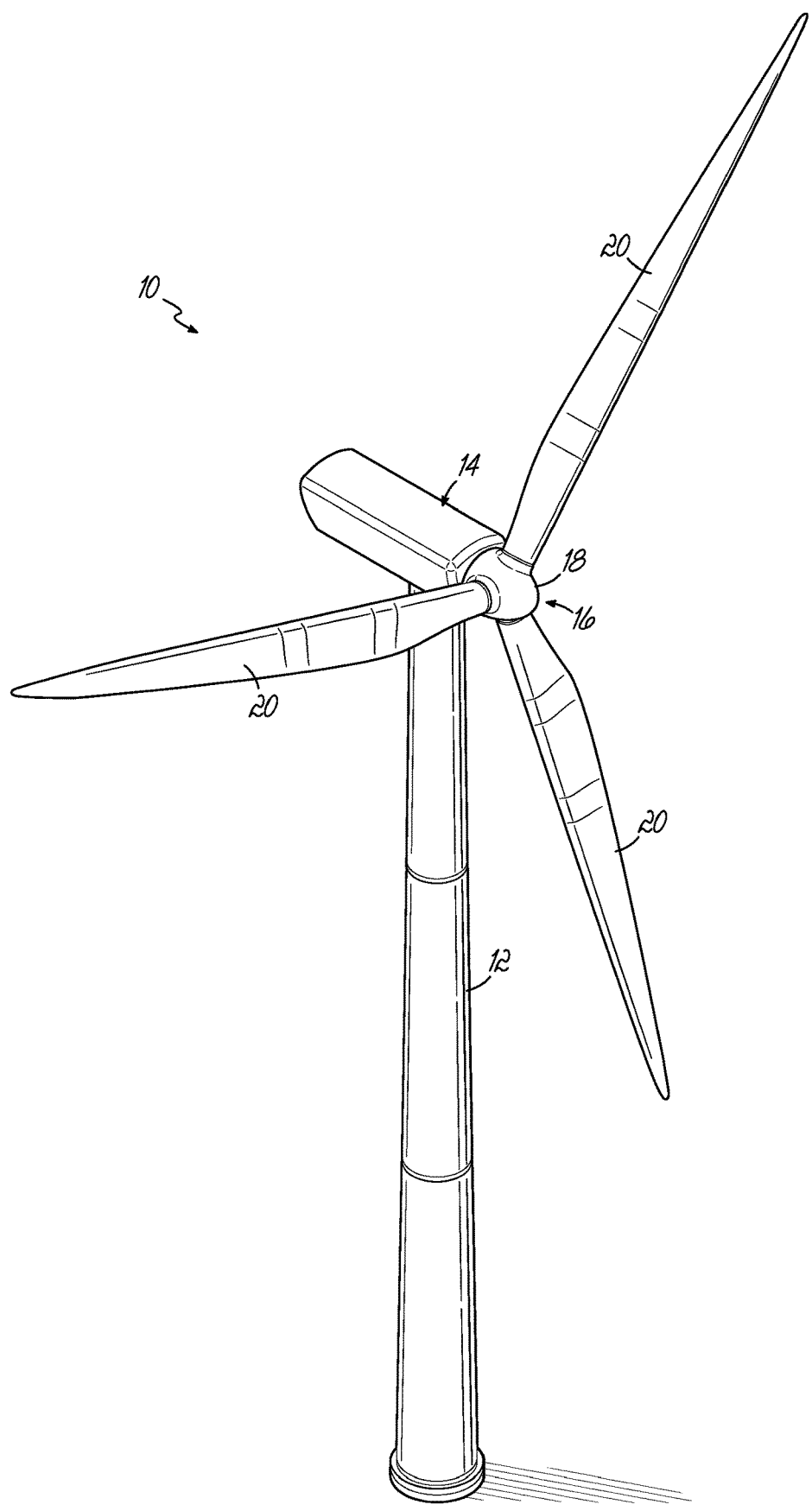
FIG. 1 is a perspective view of an exemplary wind turbine in accordance with an embodiment of the invention including a nacelle and a rotor.

FIG. 1 illustrates an exemplary wind turbine 10 that may implement yaw control in accordance with an embodiment of the invention. The wind turbine 10 includes a tower 12, a nacelle 14 disposed at the apex of the tower 12, and a rotor 16 operatively coupled to a generator in the nacelle 14. In addition to the generator, the nacelle 14 typically houses various components needed to convert wind energy into electrical energy and needed to operate and optimize the performance of the wind turbine 10. The tower 12 supports the load presented by the nacelle 14, rotor 16, and other wind turbine components housed inside the nacelle 14. The nacelle 14 rotates clockwise and counterclockwise with respect to the tower 12 under the control of a yaw system as discussed herein. The tower 12 of wind turbine 10 elevates the nacelle 14 and rotor 16 to a height above ground level that allows the rotor 16 to spin freely and at which the air currents have lower turbulence and higher velocity.

The rotor 16 includes a hub 18 and one or more (e.g., three) blades 20 attached to the hub 18 at locations distributed about the circumference of the hub 18. The blades 20 project radially outwardly from the hub 18, and are configured to interact with passing air currents to produce rotational forces that cause the hub 18 to spin about its longitudinal axis. This rotational energy is delivered to the generator housed within the nacelle 14 and converted into electrical power. To optimize performance of the wind turbine 10, the pitch of blades 20 is adjusted by a pitch system in response to wind speed and other operational conditions.

Figure 2:
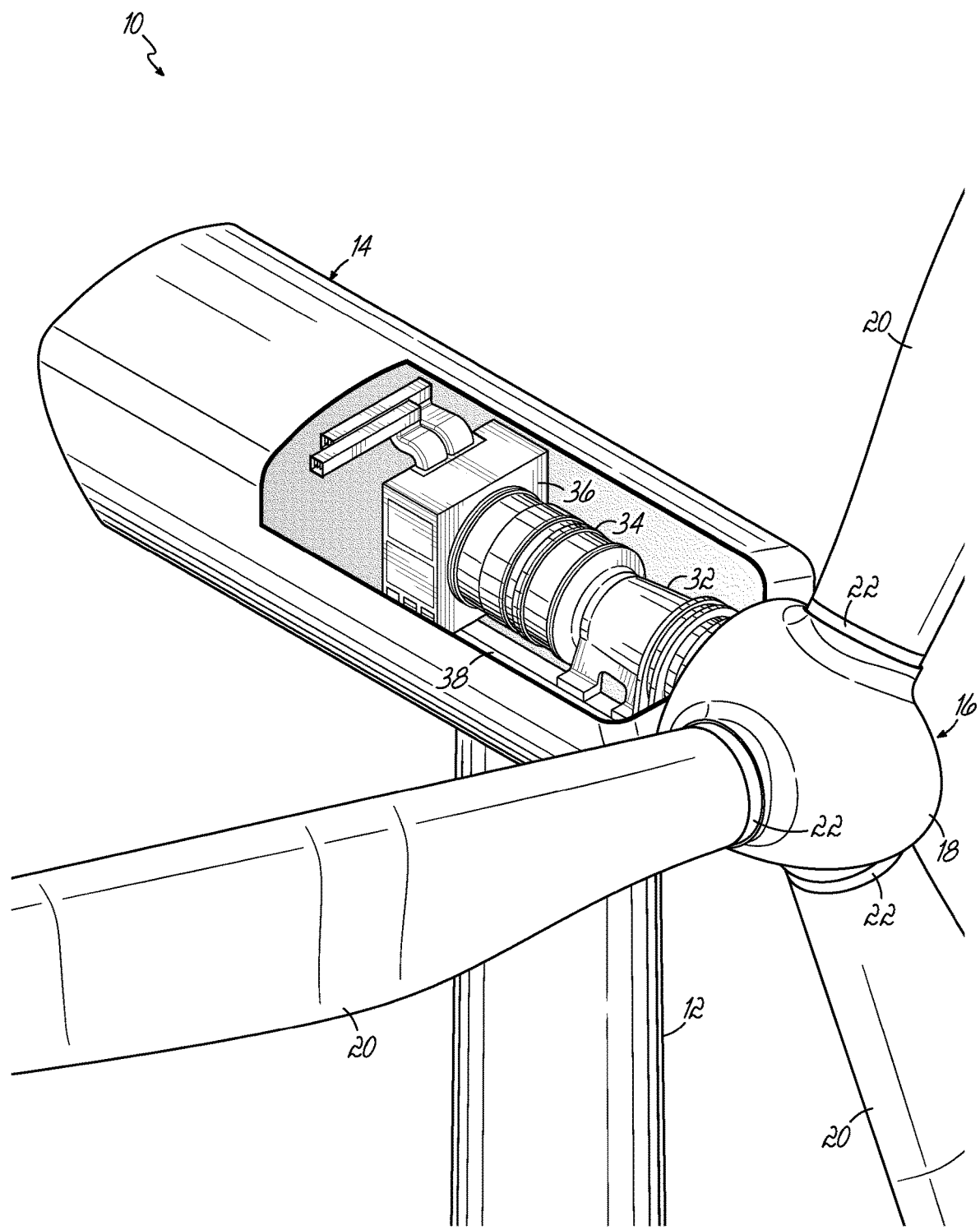
FIG. 2 is a front view in partial of a portion of the rotor of FIG. 1 showing blades attached to a hub of the rotor.

FIG. 2 presents a perspective view in which the nacelle 14 is partially sectioned or broken away to expose structures housed inside. A main shaft extending from the rotor 16 into the nacelle 14 may be held in place by a main bearing support 32 which supports the weight of the rotor 16 and transfers the loads on the rotor 16 to the tower 12. The main shaft may be operatively coupled to a gearbox 34 that transfers the rotation thereof to a generator 36. The electrical power produced by the generator 36 may be supplied to a power grid (not shown) or an energy storage system (not shown) for later release to the grid as understood by a person having ordinary skill in the art. The yaw system of the invention as discussed herein moves the nacelle so the electrical power is generated efficiently based on wind conditions. In this way, the kinetic energy of the wind may be harnessed by the wind turbine 10 for power generation. The nacelle 14 may also house other equipment (not shown) used to operate the wind turbine 10, such as hydraulic pumps, hydraulic accumulators, cooling systems, controllers, sensors, batteries, communication equipment, etc.

The weight of the nacelle 14 including the components housed therein may be carried by a bad bearing structure 38. The bad bearing structure 38 may include an outer housing of the nacelle 14 and one or more additional structural components such as a framework or lattice, and a gear bell which through the yaw bearing 42 operatively couples the bad of the nacelle 14 to the tower 12. (See FIG. 3) The yaw bearing 42 is configured to allow the nacelle 14 to be rotated into or out of the wind by the yaw system. The hub 18 may house at least a portion of a pitch system that includes one or more pitch drives that include actuators (e.g., a hydraulic cylinder, electrical actuator, mechanical actuator, etc.) configured to provide a pitch force and rotate the position or pitch of the respective blades 20 about pitch bearings 22 of rotor 16 as desired.

Figure 3:
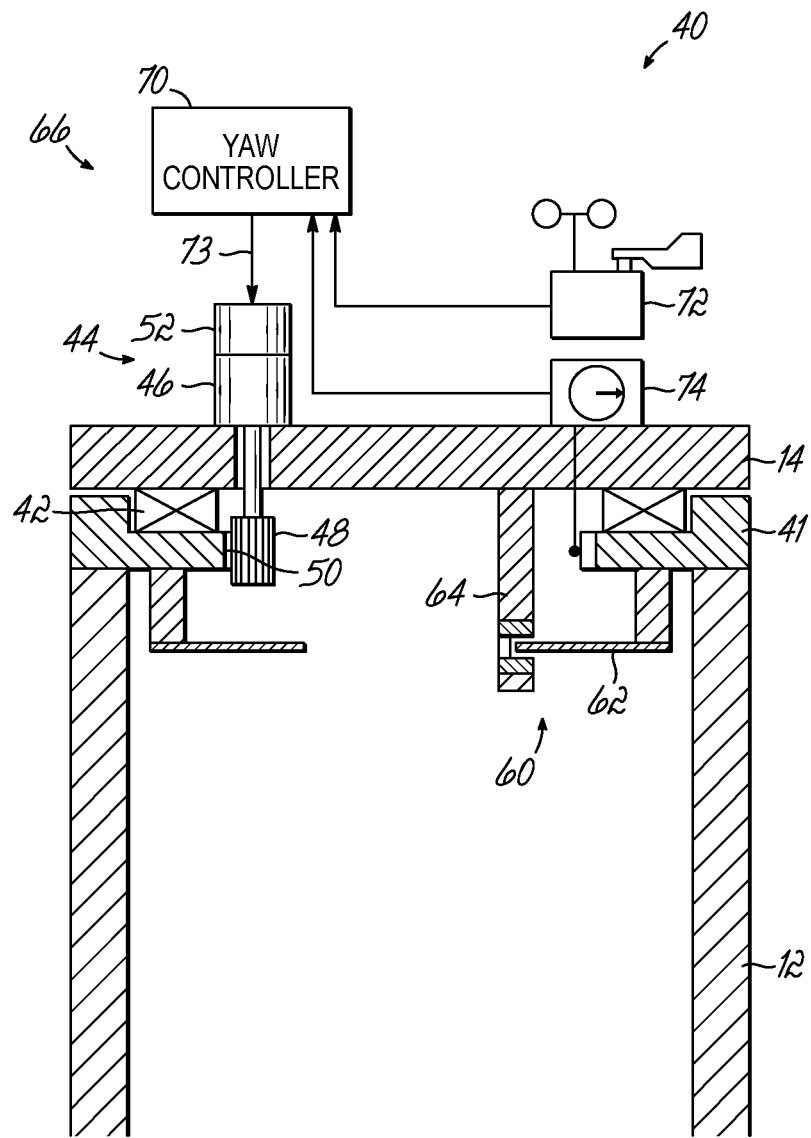
FIG. 3 is a cross-sectional view of a portion of a yaw system for the wind turbine of FIG. 1.

FIG. 3 illustrates a cross sectional view of a yaw system 40 for adjusting the yaw of a nacelle. With reference to FIG. 3, the nacelle 14 is rotatably supported on a yaw gear 41 that is itself supported on the uppermost end of the tower 12. For convenience of illustration, the nacelle 14 is shown as a single representative block in FIG. 3, whereas in reality the nacelle is a much larger structure, as understood by a person of ordinary skill in the art. The yaw gear 41 comprises a yaw bearing 42 on which the nacelle 14 is mounted so that it is able to rotate with respect to the tower 12 and gear 41. The yaw bearing 42 may be any type of bearing that would be suitable for such a high-load application, for example a gliding yaw bearing, or a roller yaw bearing could be used, both of which would be well-known to the skilled person.

Figure 3A:
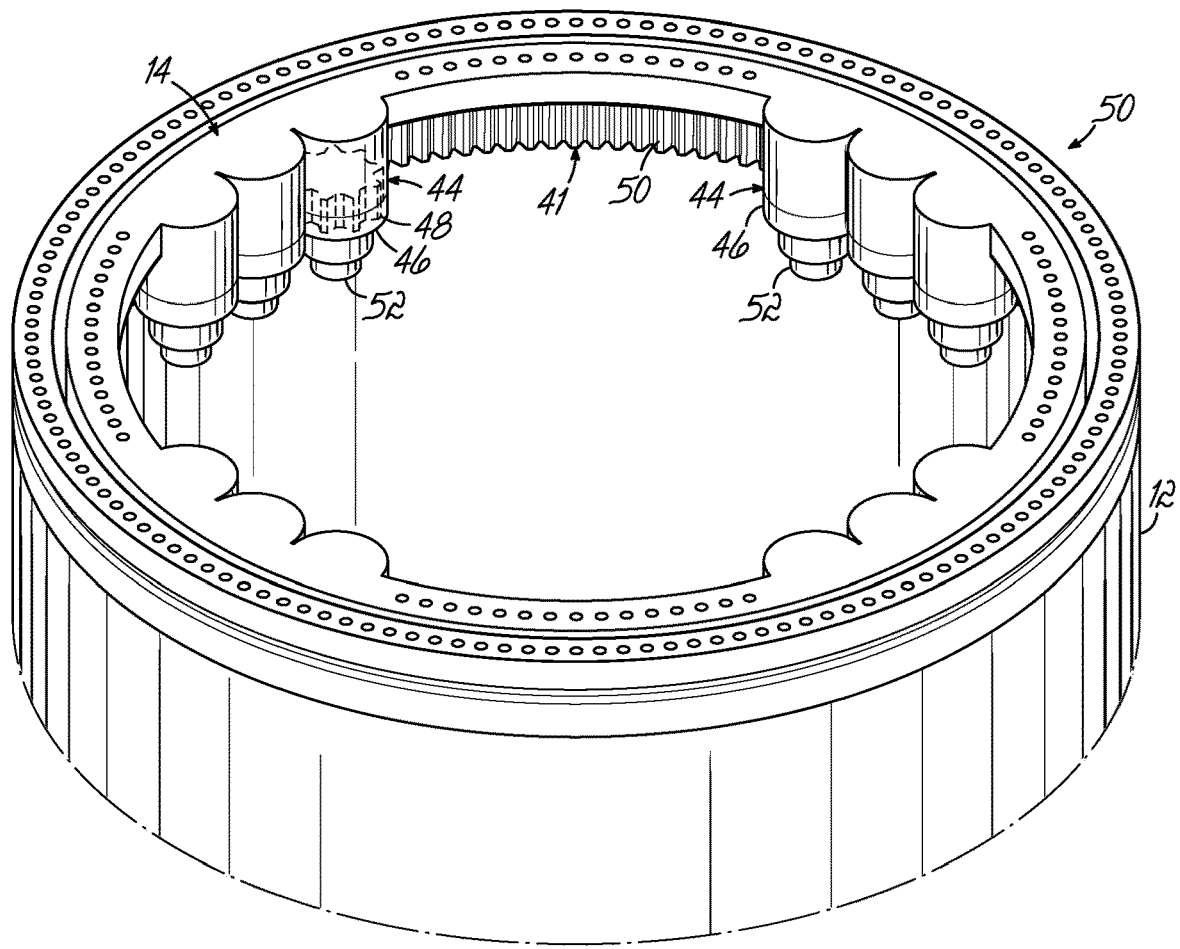
FIG. 3A is a prospective view of various yaw drive components of a yaw system for the wind turbine of FIG. 1.
Figure 3B:
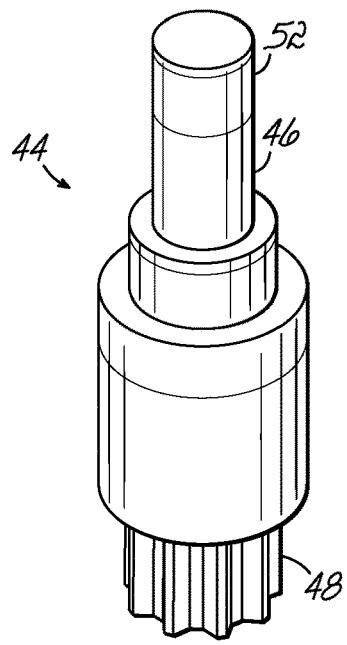
FIG. 3B is a prospective view of a yaw motor and brake element of an exemplary yaw drive as illustrated in FIG. 3A.

Rotational movement of the nacelle is driven by one or more yaw drives or drive actuators 44. Only a single drive 44 is shown in FIG. 3 for simplicity, but it is common for several drives to be provided in order to provide the high levels of torque needed to rotate the mass of the nacelle. For example, FIG. 3A illustrates an example of plurality of yaw drives 44 arranged in a circular fashion around a yaw gear 41. Each yaw drive 44 may include a yaw motor component 46 that may be mounted to the nacelle. For example, the yaw drives 44 might be mounted on a main structural component such as a nacelle bed plate or base frame. The yaw drive also includes a yaw gear or pinion gear 48 that is engaged with gear teeth 50 of the yaw gear 41 for yaw control. Part of the gearing in the yaw gear 48 of the yaw drive actuator would include suitable reduction gearing for converting the high speed rotation of the yaw motor component 46 to a low speed rotation of the yaw gear 41. Typically, the yaw motor 46 would be an AC motor and the reduction gearing would be such that the nacelle would take several minutes to turn through a full rotation on the tower.

The yaw drive 44 also includes a brake 52 that is an electromechanical brake used to provide a braking function for the yaw drive 44. The brake 52 operates to provide braking for the yaw motor 46 or the maintenance of an inertial load when operated. In one embodiment, the brake 52 is a power-off brake that applies braking to the motor for creating an inertial load when power is not applied. When power is applied, the braking force or function is removed and the yaw motor 46 and coupled yaw gear 48 turn freely. The brake 52 may also prevent nacelle rotation by providing a torque counter to the direction in which the nacelle is being urged to rotate, for example due to rotational moments imposed by wind effects.

For braking of the nacelle an additional braking system might also be implemented as well if needed. For example, the wind turbine might utilize a yaw system that includes a mechanical yaw brake 60, as is shown in FIG. 3. The yaw brake 60 includes a braking surface provided by brake ring or disk 62 associated with the tower 12 and one or more brake calipers 64 associated with the nacelle 14. The brake caliper 64 may act in the usual way to apply a braking force to the brake ring 62 in order to fix the nacelle 14 in position which removes torque from the yaw drives 44. Such a mechanical yaw brake 60 may be hydraulically driven or electrically driven. In other embodiments the yaw system does not incorporate a yaw brake 60 and relies on the brakes 52.

Figure 4:
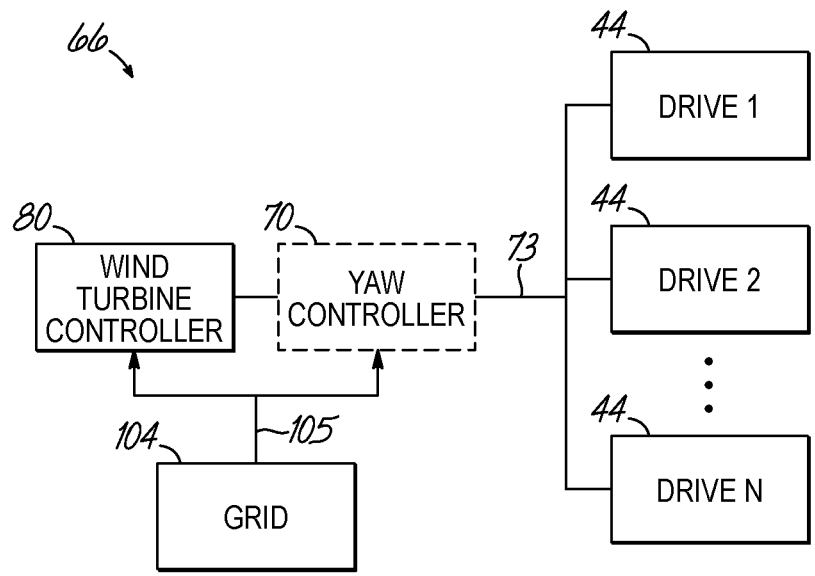
FIG. 4 is a diagrammatic view of a yaw control system for controlling yaw motors to provide a yaw function in a wind turbine.

In one exemplary embodiment of the invention, the yaw system 40 incorporates a yaw control system 66 to provide monitoring and control over the activity of the yaw drives 44 based upon grid conditions. Referring to FIG. 3, the yaw control system 46 may include a yaw controller 70 and a wind direction sensor 72. Note that the yaw controller 70 may be implemented as part of a main wind turbine controller as shown in FIG. 4 which is a schematic view of an exemplary yaw control system 66 that illustrates a wind turbine controller 80 and an optional separate yaw controller 70. Specifically, the yaw controller 70 may be implemented as a dedicated or separate controller including the required processing capability, memory and input/output functions for implementing the invention. Alternatively, the yaw control/controller and its functionality in accordance with the invention may be implemented as part of a main wind turbine controller or control unit 80. As such, the invention is not limited to the physical location of the necessary yaw controller in the wind turbine and so controller 70, 80 is referred to for addressing the various scenarios.

The wind sensor 72 provides a measure of the relative wind direction to the yaw controller 70, 80 and, in turn, the yaw controller 70, 80 provides a control signal 73 to each of the yaw drives 44. The yaw system 40 may also incorporate a monitoring system for determining the yaw gear position, such as a position sensor 74. Referring to FIG. 4, the wind turbine controller 80 or separate yaw controller 70 are coupled to the grid 104 for obtaining one or more control signals 105 that are reflective of a grid condition of the electric grid. For example, the control signals 105 may include information or data regarding grid voltage or frequency conditions and variations. Drive control signals are provided by the controller 70, 80 to the ganged drives 44. Typically, the yaw motors 46 will be operable to run at a single speed, so the control signals 73 will thus activate the yaw drives and motors with an ON signal to run at a single speed and to run either clockwise (CW) or counter-clockwise (CCW), or an OFF or STOP control signal to deactivate the yaw drives. Note that although single speed yawing is common, it is also possible to have a system which uses more than one yawing speed, and also variable yawing speed depending on operational conditions.

Figure 5:
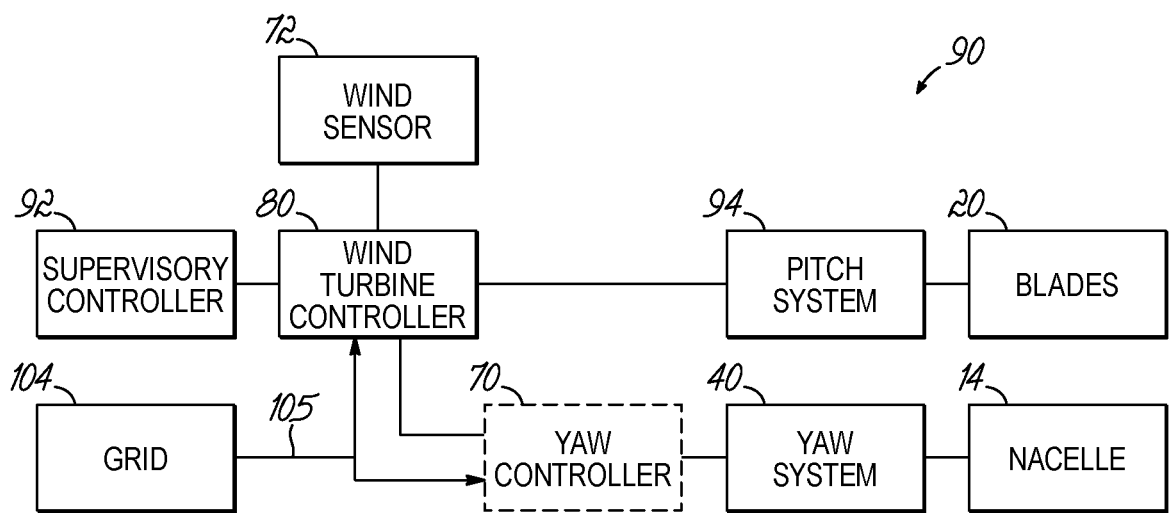
FIG. 5 is a schematic view of an exemplary wind turbine control system implementing a yaw control system.

FIG. 5 illustrates a schematic view of a larger exemplary control system 90 that may be used to control the wind turbine 10. The control system 90 may be configured to implement an embodiment of the invention for the desired yaw control. The control system 90 includes a wind turbine controller 80 in communication with a wind sensor 72, a pitch system 94, a yaw system 40 that interfaces with the nacelle 14 as illustrated in FIG. 3, and a supervisory controller 92. The supervisory controller 92 may be configured to implement a system-wide control strategy for a group of wind turbines 10 (e.g., a wind farm) that optimizes the collective performance of the wind turbines 10, e.g., to maximize power production of the group and minimize overall maintenance. The yaw system 40 may be controlled by the wind turbine controller 80 or by a separate yaw controller 70 to control the direction in which the nacelle 14 is pointed. As known for wind turbine control, the pitch system 94 may be configured to adjust the pitch of the blades 20 collectively or independently in response to a pitch command signal received from the wind turbine controller 80. Data from the grid 104 is used by the controller 70, 80 for yaw control according to the invention.

In accordance with one aspect of the invention, the yaw system monitors a grid condition, such as a grid voltage condition or frequency condition and provides control of the yawing function based upon the determined grid voltage and/or frequency condition. More specifically, the yaw system selectively delays or prevents yawing during extreme voltage and frequency situations to ensure a more proper and accurate yawing function and to ensure proper operation of the various components, particularly the drive motors of the yaw system. Specifically, referring to FIG. 6 a yaw control system 40a is illustrated for implementing embodiments of the invention. The elements of control system 40a for controlling the yaw function of a wind turbine 10 utilizes like reference numerals, where applicable, with the yaw systems as described herein, such as controller 70, 80. The yaw control system 40a incorporates a power supply suitable for powering various of the components, noted as system power 100. A wind turbine may also have backup power 102 that may be utilized for running the wind turbine and yaw system 40a in the absence of system power 100.

Figure 6:
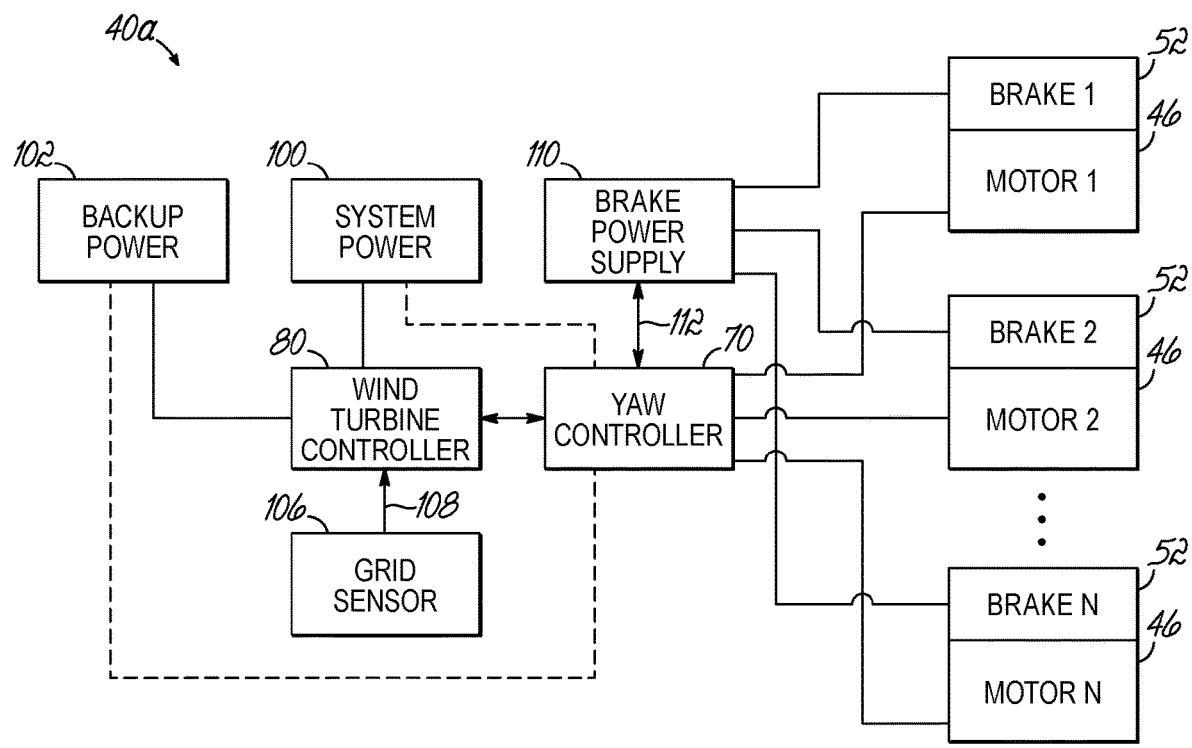
FIG. 6 is a schematic view of an exemplary wind turbine control system implementing a yaw control system in accordance with an embodiment of the invention.

In accordance with one feature of the invention, the system power 100 or backup power 102 may be coupled with the wind turbine controller 80 or yaw controller 70 depending on where the functionality of the invention is implemented. As noted, the invention may be implemented through operation of the wind turbine controller or through a separate yaw controller 70. FIG. 6 illustrates control of the various yaw motors 46, by a separate yaw controller 70, but a person of ordinary skill in the art would understand that such yaw motors 46 may also be directly coupled with the wind turbine controller 80 for control thereby if the yaw controller functionality is implemented in the wind turbine controller.

In accordance with one feature of the invention, as illustrated in FIG. 5, the yaw system 40a is coupled with the electric grid 104 to receive control signals and various data from the grid. Specifically, one or more grid sensors 106 might be implemented as shown in FIG. 6 for providing one or more control signals 108 reflective of the grid conditions, such as a grid voltage or grid frequency condition, in order to control the yawing function based upon varying grid conditions. The grid sensor 106 and respective control signal(s) 108 may be provided to the wind turbine controller. In various systems, the wind turbine controller is often coupled with the grid to receive such data and/or control signals based upon grid conditions.

In one embodiment of the invention, if the grid voltage is sensed and the sensor 106 indicates that the grid conditions are varying and thus the grid conditions and variations may be outside of an acceptable range, the yawing function may be selectively delayed. The sensor signals or other signals are reflective of a grid condition, such as being reflective of a grid voltage of the electric grid, and the signal or signals are provided to a controller that can then evaluate the signal. That is, the controller 70, 80 may evaluate the grid condition signal or other signal and would selectively delay the yaw motors 46 and yawing would not occur while the grid conditions exist. The grid condition signal or other control signal might be compared to a grid variation range of operation for the electric grid and if the signal is outside the grid variation range, the yaw function may be delayed. Particularly if the grid voltage is outside of the acceptable range for yawing in accordance with the invention, the yawing may be selectively delayed for a few seconds or it may be delayed for up to a few minutes based upon the control signal 108, such as a sensed voltage. In one embodiment of the invention, the yawing may be selectively delayed for a preset delay time. One acceptable operating range for the grid voltage in accordance with the invention might be between −13% to +16%. However, it would be understood by a person of ordinary skill in the art that such an acceptable range may vary, within reason, based upon the wind turbine, as well as the specific components of the yaw system.

In accordance with one aspect of the invention, a maximum time limit may be utilized, such as a 180 seconds maximum, for the delay of the yawing function. For example, upon a determination that a control signal(s) is outside of the grid variation range, the controller might further be configured to periodically compare the control signal(s) to the grid variation range over time and determine if the delay of the yaw function exceeds the time limit. If the delay exceeds the time limit or after such a maximum time limit has elapsed, the yawing function may be restored even if the sensed control signal 108 is still outside of the acceptable range. To delay the yawing function, the various yaw motors 46 would not be powered through the wind turbine controller 80 or yaw controller 70 or rather would receive a STOP control signal.

In accordance with another feature of the invention, the brake elements 52 of the yaw system are separated from the grid or other power system 100, 102 used to power the yaw system. Specifically, yaw control 40a, as illustrated in FIG. 6, provides a separate brake power supply 110 coupled with the brakes 52 of each of the yaw motors 46. Specifically, the brakes 52 are powered independently of the system power or grid power which may be used to power the various yaw motors 46. In one embodiment the invention, the brakes 52 are powered separately by a common voltage stabilized power supply 110, such as, for example, a 24 volt DC power supply. Such a stabilized power supply 110 would be able to keep the voltage power signal to the brakes 52 within a stable range of approximately +/−10% for controlling the brakes during extreme voltage variations on the grid. In that way, the invention ensures that the brakes will disengage properly during extreme grid voltage variations. As such, the motor torque used to provide the yawing function will not have to overcome the brake torque as in current systems wherein the brake functionality is detrimentally affected by the grid variations. This leads to improved yaw capacity and also longer wear lives with respect to the brake 52 as well as the yaw motors 46. Furthermore, the yaw motors and various other components of the yaw system are not overloaded.

It will be understood by a person of ordinary skill in the art that other stabilized power supplies might be implemented. Furthermore, the range of +/−10% might also be adjusted depending upon the operational characteristics of the brakes 52. For example, a larger or smaller range of voltage stability might be used.

In accordance with another feature of the invention, the yaw control system, including yaw controller 70, 80 is configured to control the yawing function based upon the ability to provide sufficient braking, A brake control signal 112 is provided to the controller 70, 80 that is reflective of the power supply 110. For example, the signal 112 may be reflective of whether the brake power supply is operational. To that end, the brake power supply 110 is coupled to the yaw controller 70, 80 through a suitable connection for providing brake control signal 112. The appropriate controller 70, 80 monitors or evaluates the brake power supply 110 and/or control signal 112 or other data regarding the operation of the brake elements 52 as related to the yawing function. Based on that evaluation, such as a determination that the brake power supply 110 is not operational, the yaw controller 70, 80 would selectively delay the yaw function and prevent the yaw motors 46 from operating.

Accordingly, the yaw control system of the invention, whether through the wind turbine controller 80 or a separate yaw controller 70, would monitor grid conditions, such as through control signal 108, and would also monitor the yaw components such as through the brake power supply 110 and control signal 112, in order to make decisions with respect to when the yawing function would be appropriate or whether it should be delayed. The present invention selectively delays yawing in scenarios wherein extreme voltage and frequency situations may occur. Furthermore, the yawing function may be selectively delayed or otherwise prevented if the brakes 52 would not operate properly, such as upon the failure of brake power supply 110.

While FIG. 6 illustrates a system 40a that incorporates both controllers sensing the grid voltage for actuation of the yawing function as well as a separate brake power supply for the yaw motor brakes, each of those features might be implemented separately. For example, if the brakes 52 are not operated through a separate brake power supply 110, control of the yawing function through yaw controller 70, 80 may still be implemented so as to utilize an acceptable range of grid variation that addresses the brakes. For example, if the brakes will not disengage properly below a −10% voltage and the brakes are powered based on the grid power, the acceptable range at which the yaw controller 70, 80 operates would take that into account. For example, the acceptable limit of grid voltage variation might then be set between −10% and +10% or some other upper limit, as long as the grid voltage variation does not proceed below the operational voltage at which the brakes 52 are compromised.

Furthermore, an embodiment of the invention may only implement monitoring of the brake power supply 110 in affecting or delaying the yawing function, independently of grid variation.

In some scenarios, as illustrated in FIG. 6, a backup power unit 102 might be coupled with various of the elements, including a wind turbine controller 80 or separate yaw controller 70 as illustrated. The backup power system 102 might be an external backup generator.

The wind turbine controller 80 or controller 70 as described herein will include the necessary elements, such as a processor and memory, for running a control program to effect the present invention as understood by a person of ordinary skill in the art. Such memory for example may store suitable grid variation ranges against which a control signal 105, 108 from the grid may be compared to see if the yaw function should be delayed as described herein. For example, certain acceptable operating ranges reflective of variations from a nominal grid parameter, such as grid voltage might be stored for use in the control scheme to compare against one or more control signals. As discussed herein, one exemplary range might be −13% to +16% with respect to the nominal grid voltage for evaluating if the yaw function should be executed or delayed. Other ranges might also be used.

Figure 7:
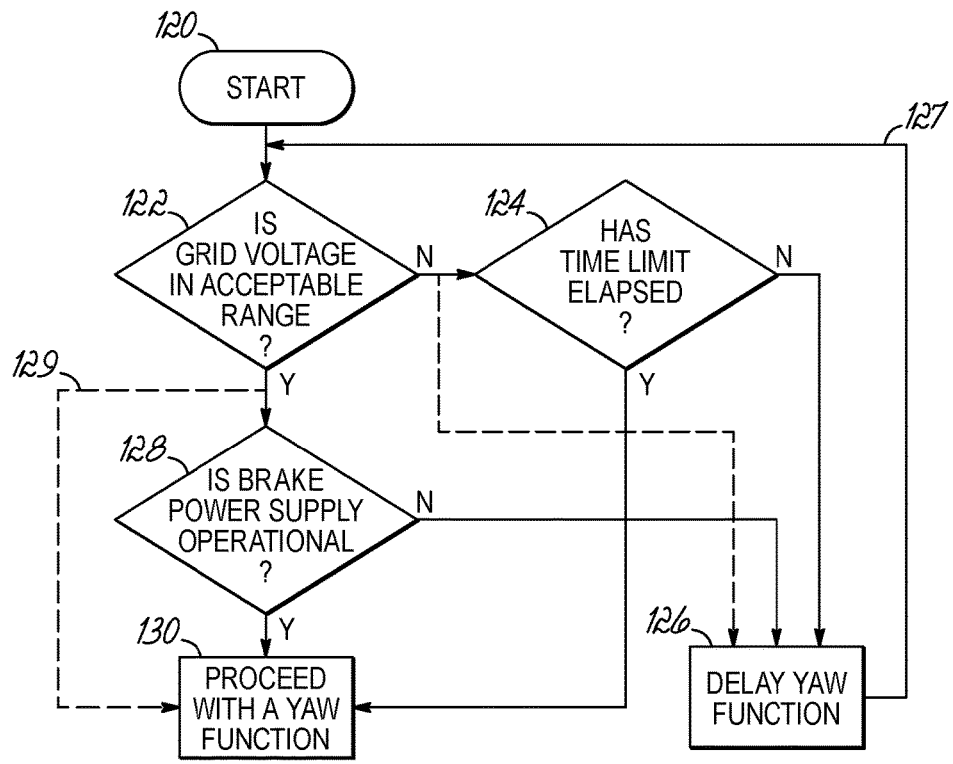
FIG. 7 is a flow diagram of a yaw control system in accordance with an embodiment of the invention.

FIG. 7 illustrates one embodiment of the program flow of the yaw controller 70, 80 in accordance with an embodiment of the invention. When a yaw command is presented by the yaw control system, a grid condition may be evaluated, and the protocol may start at block 120. In the embodiment illustrated in FIG. 7, the voltage is evaluated. But the grid frequency might also be evaluated based on a control signal 108 and compared against a suitable range or other metric.

Referring to FIG. 7, a determination is made regarding whether the grid voltage is in an acceptable range at block 122. The control signal 108 received by the controller 70, 80 might be evaluated. For example, based on the sensed grid voltage it might be evaluated or tested by being compared against a range, such as −13% to +16% with respect to a nominal grid voltage, as noted. If the grid voltage is not within or is outside the range, there may be a delay in the yaw function at 126 and the controller would not operate the yaw motors to move the nacelle. The comparison of the control signal against a suitable range of conditions may be done periodically. For example, based on a loop path 127, the system may check the grid voltage in relation to the acceptable range on a periodic or loop basis. Once the grid voltage is in an acceptable range, then the yaw function may follow path 129, for example, and may proceed at 130, as discussed herein.

In one embodiment of the invention, a time limit on the delay of the yaw function may be implemented. If a time limit function is implemented, following a determination that the grid voltage is outside of an acceptable range at 122, a further determination could be made of whether the time limit has elapsed at 124. If the time limit has not been reached, the yaw function delay would proceed at 126. As the control loop of the yaw function delay progresses in loop 127, the time limit could be consecutively checked if the grid voltage remains out of the acceptable range. If the time limit has been reached or a set amount of time has elapsed, then the yaw function might proceed at 126 despite the grid voltage being out of an acceptable range as shown in FIG. 7.

If the grid voltage is within an acceptable range, that is, YES at 122, the yaw function might proceed at 130, such as through path 129 as noted. In an alternative embodiment of the invention, the brakes might be powered by an independent brake power supply 110 as shown in FIG. 6 and the supply might be monitored. In such a case, the controller 70, 80 might be configured to determine the operational status of the independent brake power supply even if the grid voltage is acceptable or in an acceptable range. Referring to FIG. 7, at block 128 the brake power supply could be checked by the controller 70, 80. If the brake power supply is operational, the yaw function may proceed at 130. However, if the brake power supply is not operational, the yaw function may be delayed at 126.

In an alternative embodiment of the invention that incorporates an independent brake power supply for the brakes 52, the functionality of the controller 70, 80 and the evaluation of the brake power supply at block 128 may take place independently in a separate control flow from the evaluation of the grid variation. In that scenario, before a yaw command or function would be executed, the functionality of the brakes through their supply of power could be evaluated at 128, such as be evaluating the control signal 112 reflective of the power supply 110. If the power supply is not operational, as reflected by the control signal 112, the brakes would not have power. In such a scenario, the yaw function could be delayed at 126. It will be understood by a person of ordinary skill in the art that the functionality of FIG. 7 may be implemented in the controller 70, 80 as necessary to achieve the noted control of the yaw function.

Thus, the invention in its broader aspects is therefore not limited to the specific details, representative apparatus and method, and illustrative example shown and described. Accordingly, departures may be made from such details without departing from the spirit or scope of applicants' general inventive concept.

The invention claimed is:

1. A wind turbine including a nacelle mounted to move on a tower for providing electrical power to an electric grid, the wind turbine comprising:
   a yaw system including at least one yaw motor operable to provide a yaw function for the wind turbine and move the nacelle with respect to the tower;
   a controller coupled with the yaw system for controlling an operation of the at least one yaw motor in the yaw function;
   a control signal provided to the controller that is reflective of a grid condition of the electric grid; and
   the controller configured for evaluating the control signal and selectively delaying the yaw function based upon the control signal, and proceed with the yaw function after expiry of the delay, and wherein the controller includes a time limit and the controller is configured to determine if the delay of the yaw function exceeds the time limit, and to proceed with the yaw function if the delay exceeds the time limit.

2. The wind turbine of claim 1, wherein the controller includes a grid variation range of operation associated with the electric grid, the controller comparing the control signal to the grid variation range and selectively delaying the yaw function based upon the comparison.

3. The wind turbine of claim 2 wherein the yaw function is delayed if the control signal is outside of the grid variation range.

4. The wind turbine of claim 1 wherein the control signal provided to the controller is reflective of a grid voltage of the electric grid.

5. The wind turbine of claim 1 wherein the controller, upon a determination that the control signal is outside of a grid variation range, is further configured to periodically compare the control signal to the grid variation range over time.

6. The wind turbine of claim 1 wherein the yaw system further includes at least one brake for braking the at least one yaw motor and a separate power supply for the at least one brake, a brake control signal provided to the controller that is reflective of the power supply for the at least one brake and the controller further configured for evaluating the brake control signal and selectively delaying the yaw function based upon the brake control signal.

7. The wind turbine of claim 6 wherein the brake control signal is reflective of whether the power supply is operational, the controller further configured for evaluating the brake control signal and selectively delaying the yaw function if the power supply is not operational.

8. A method of controlling a wind turbine having a nacelle mounted to move on a tower for providing electrical power to an electric grid, the method comprising:
    operating a yaw system including at least one yaw motor operable to provide a yaw function for the wind turbine and move the nacelle with respect to the tower;
    providing a control signal that is reflective of a grid condition of the electric grid; and
    evaluating the control signal and selectively delaying the yaw function based upon the control signal, and proceeding with the yaw function after expiry of the delay, and
    wherein the wind turbine comprises a controller which includes a time limit, and wherein the controller is configured to determine if the delay of the yaw function exceeds the time limit, and to proceed with the yaw function if the delay exceeds the time limit.

9. The method of claim 8 further comprising comparing the control signal to a grid variation range and selectively delaying the yaw function if the control signal is outside of the grid variation range.

10. The method of claim 9 further comprising, upon a determination that the control signal is outside of the grid variation range, periodically comparing the control signal to the grid variation range over time.

11. The method of claim 8 wherein the yaw system further includes at least one brake for interacting with the at least one yaw motor and a separate power supply for the at least one brake, the method further comprising:
    providing a brake control signal that is reflective of the power supply for the at least one brake and evaluating the brake control signal and selectively delaying the yaw function based upon the brake control signal.

12. The method of claim 11 wherein the brake control signal is reflective of whether the power supply is operational, the method further comprising:
    evaluating the brake control signal and selectively delaying the yaw function if the power supply is not operational.

13. A controller for controlling a yaw function of a wind turbine including a nacelle mounted to move on a tower for providing electrical power to an electric grid and a yaw system that includes at least one yaw motor operable for moving the nacelle with respect to the tower, the controller configured to perform an operation, comprising:
    controlling the operation of the at least one yaw motor in the yaw function for moving the nacelle;
    receiving a control signal that is reflective of a grid condition of the electric grid; and
    evaluating the control signal and selectively delaying the yaw function based upon the control signal, and proceeding with the yaw function after expiry of the delay, and
    wherein the wind turbine comprises a controller which includes a time limit, and wherein the controller is configured to determine if the delay of the yaw function exceeds the time limit, and to proceed with the yaw function if the delay exceeds the time limit.

14. The controller of claim 13, wherein the control signal is reflective of a grid voltage of the electric grid.

15. The controller of claim 13, wherein the operation further comprises comparing the control signal to a grid variation range of the electric grid and selectively delaying the yaw function based upon the comparison.

16. The controller of claim 15, wherein the yaw function is delayed if the control signal is outside of the grid variation range.

17. The controller of claim 13 wherein the yaw system further includes at least one brake for braking the at least one yaw motor and a power supply for the at least one brake, a brake control signal is provided to the controller that is reflective of the power supply for the at least one brake, and wherein the controller is further configured for evaluating the brake control signal and selectively delaying the yaw function based upon the brake control signal.

* * * * *